United States Patent [19]
Choi et al.

[11] Patent Number: 5,818,858
[45] Date of Patent: Oct. 6, 1998

[54] DEVICE FOR PRODUCING AN ELECTRIC POTENTIAL HAVING A DIFFERENCE FREQUENCY OF A SELF-MIXED SIGNAL IN A LASER RESONATOR

[75] Inventors: Jong-Woon Choi; Young-Pyung Kim, both of Daejeon-si; Yun-Myung Kim, Seoul, all of Rep. of Korea

[73] Assignee: Korea Research Institute of Standards and Science, Daejeon-si, Rep. of Korea

[21] Appl. No.: 689,269

[22] Filed: Aug. 6, 1996

[30] Foreign Application Priority Data

Jul. 13, 1996 [KR] Rep. of Korea ............... 96-28286

[51] Int. Cl.$^6$ ............................................. H01S 3/00
[52] U.S. Cl. ..................... 372/38; 372/26; 372/28; 372/32
[58] Field of Search ............... 372/38, 26, 28, 372/32, 55

[56] References Cited

U.S. PATENT DOCUMENTS

| | | | |
|---|---|---|---|
| 4,402,606 | 9/1983 | Zalewski et al. | 356/315 |
| 4,548,496 | 10/1985 | Roberts et al. | 356/213 |
| 4,585,344 | 4/1986 | Webster | 356/311 |

*Primary Examiner*—Leon Scott, Jr.
*Attorney, Agent, or Firm*—Armstrong, Westerman, Hattori, McLeland and Naughton

[57] ABSTRACT

A device and method for measuring a difference frequency having a simple structure and utilizing optogalvanic effect for measuring a difference frequency when carbon dioxide laser light of a single wavelength is varied in frequency by a measuring object. When a part of frequency varied laser light is mixed with an original frequency of laser light by self-mixing in a laser resonator, a strength of the laser light in the resonator is modulated to a difference frequency between the original frequency and the variation frequency. Since a current change in response to strength of light is generated by the optogalvanic effect in the laser resonator, when a frequency of optogalvanic current change is measured, the difference frequency can be measured.

2 Claims, 3 Drawing Sheets

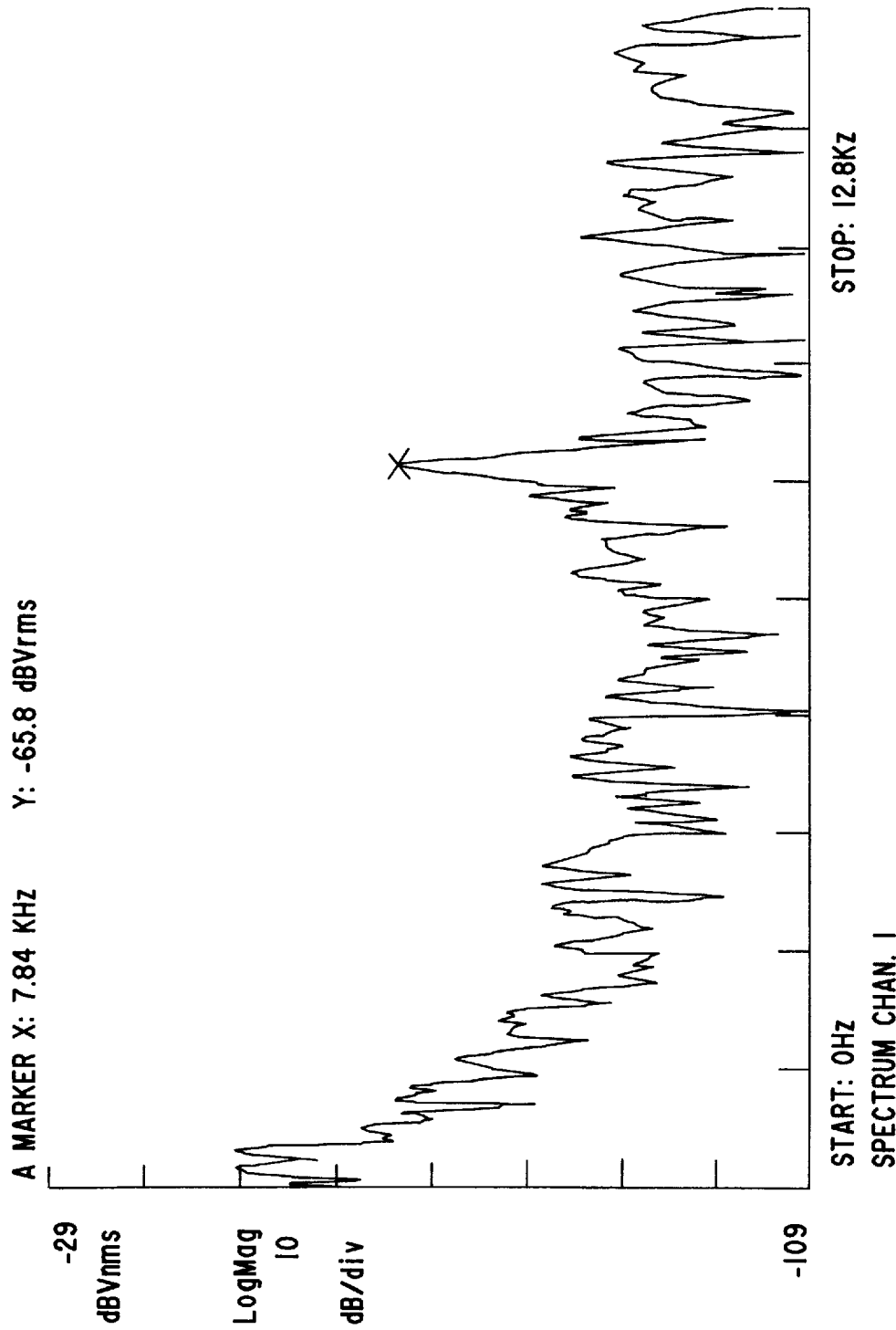

DEVICE FOR PRODUCING AN ELECTRIC POTENTIAL HAVING A DIFFERENCE FREQUENCY OF A SELF-MIXED SIGNAL IN A LASER RESONATOR

BACKGROUND OF THE INVENTION

1. Field of the Invention

The present invention relates to a device and method for measuring a difference frequency generated when a light having a frequency different from the original laser frequency is self-mixed to a laser resonator, and more particularly, to a device and method for measuring a difference frequency between two lights by measuring a current change, since a current flowing in the interior of a resonator is modulated to a difference frequency by an optogalvanic effect at a time when a mixing with original light frequency occurs by self-mixing a frequency varied light by a laser resonator in a measuring device utilizing carbon dioxide.

2. Description of the Related Art

Since a conventional frequency variation measuring device of a carbon dioxide laser is detected by using generally an MCT (Mercury cadmium Telluride) detector cooled by liquid nitrogen, the liquid nitrogen should be replenished at predetermined time. This fact has presented a hindrance in manufacturing a movable device due to a large volume of the liquid nitrogen storing container.

SUMMARY OF THE INVENTION

Therefore, the present invention solves; such a problem as above, and it is an object of the present invention to provide a device and method capable of measuring a difference of frequency without using a detecting device cooled by liquid nitrogen.

Another object of the present invention is to provide a device and method for measuring a difference frequency capable of extending the life of the measuring device by using a laser generating device itself as a detector, which is simple in structure and capable of decreasing the cost of manufacturing.

In order to attain the above object, the device and method for measuring a frequency variation of the present invention comprises laser discharging tube, a high voltage direct current supply device, a resistor or a transformer which is connected to a cathode of the laser discharging tube and which is capable of measuring a discharging current.

BRIEF DESCRIPTION OF THE DRAWINGS

FIG. 3 is a view illustrating a spectrum of a difference frequency value measured by the method of the present invention.

DETAILED DESCRIPTION OF THE PREFERRED EMBODIMENTS

Hereinafter, the present invention will be described in detail with reference to the accompanying drawings.

Figure 1:
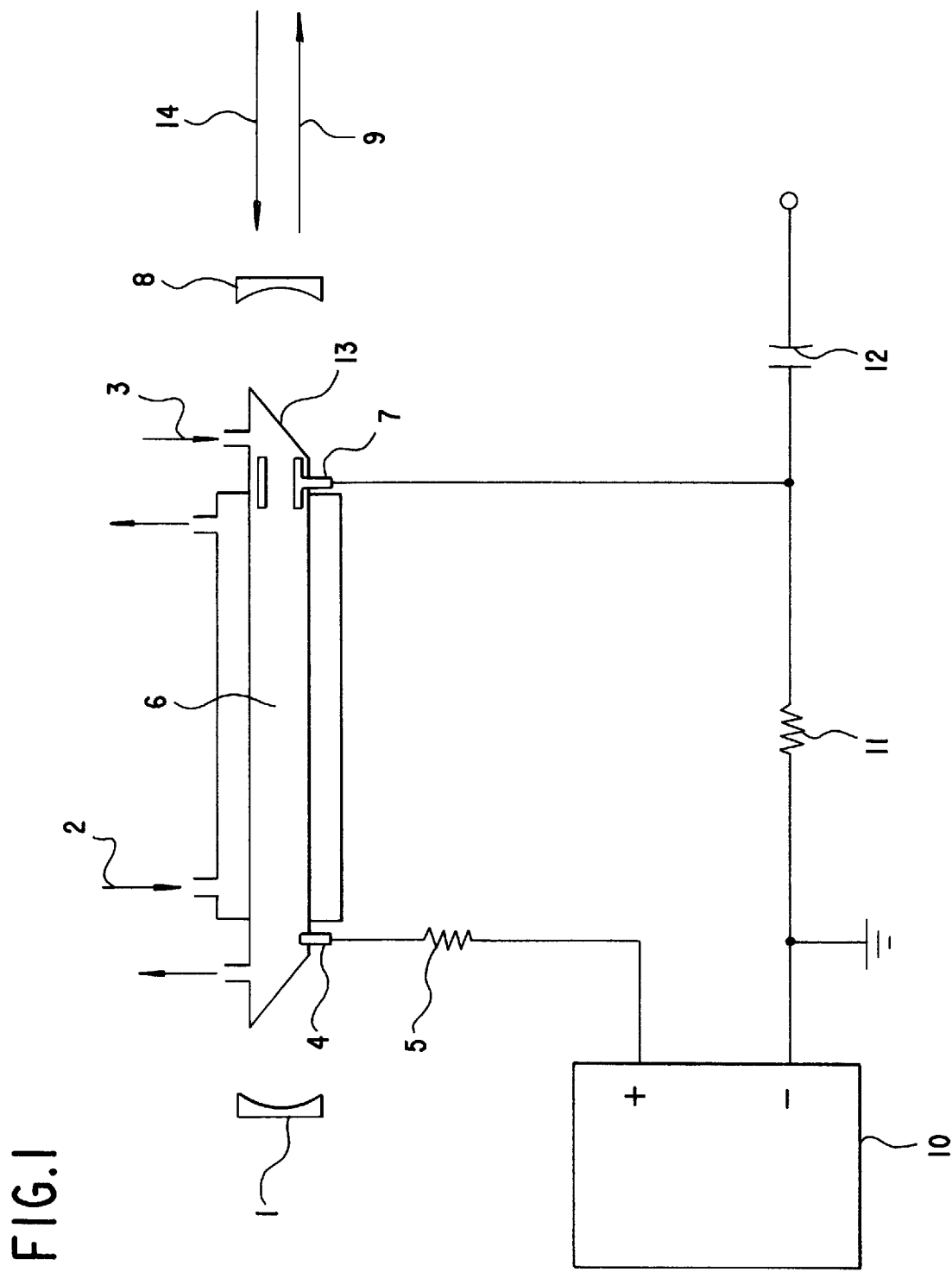
FIG. 1 is a schematic drawing showing a first embodiment of a device and method for measuring a difference frequency of the present invention.
Figure 2:
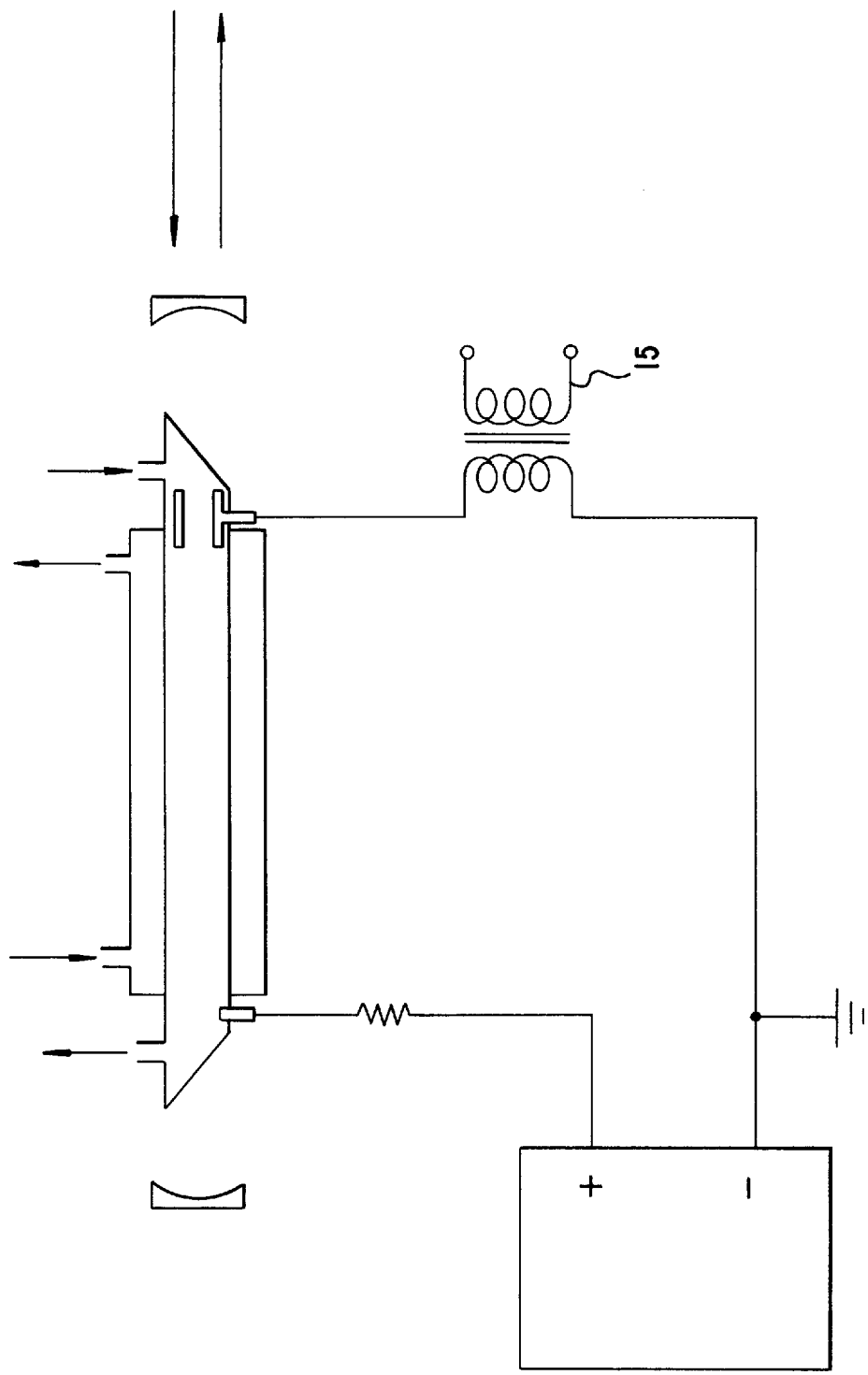
FIG. 2 is a schematic drawing showing a second embodiment of a device and method for measuring a difference frequency of the present invention.

FIG. 1 and FIG. 2 are schematic drawings showing a device and method for measuring a difference frequency of the present invention, and FIG. 3 shows spectrum of a difference frequency measured by a device and method for measuring frequency variation quantity of the present invention.

In FIG. 1, a resistor for measuring a difference frequency and a carbon dioxide laser are shown for explaining a device and method for measuring a difference frequency. In FIG. 2, a transformer for measuring a difference frequency and a carbon dioxide laser are shown for explaining a device and method for measuring a difference frequency.

The carbon dioxide laser used for the above object is a water cooled gas circulation type. As a total reflecting mirror 1, a gold coated concave mirror was used, and as an output mirror 8, a flat surface mirror of ZnSe material having a 70% reflection rate was used. $CO_2:N_2:He$ being a medium gas were continuously supplied at inlet 3 so as to maintain 31 Torr pressure in a ratio of 1:5.5:24.5 to a discharging tube 6. A high voltage was applied to both side electrodes 4, 7 of the discharging tube by using a direct current high voltage power supply means 10, whereby a discharging excitation was executed. As a discharging electrode, a tungsten bar was used for a positive electrode 4 for preventing a spattering, while a negative electrode 7 is attached by making a nickel plate in cylindrical form to tungsten bar. A Brewster's window 13 of ZnSe material is attached to both sides of the discharging tube in order to obtain a lineally polarized light from output light and to separate the reflecting mirror from the discharging tube. A ballast resistor 5 of 600 k$\Omega$ was connected in series with the discharging tube, and then at a time of supplying a current of 10 mA, approximately 4.5 W was obtained as a maximum output, and at a basic lateral mode and 10.59 $\mu$m P 20, it was operated by a single longitudinal mode.

A frequency F1 of light 9 generated from a carbon dioxide laser was mixed with a light F2 14 being frequency varied by an external source. A laser light strength within the resonator was modulated to a difference frequencies of F1 and F2 by self mixing whereby optogalvanic current varying in response to the laser light strength was generated. Since the optogalvanic current appeared as an electric potential difference at both ends of resistor 11, when it was passed through a capacitor, a difference of frequencies F1 and F2 excluding the direct current component could be measured. When a transformer 15 was connected to a negative electrode of the laser by applying the same principle as in FIG. 2, a difference of frequencies F1 and F2 excluding the direct current component could be measured at a secondary side of the transformer.

In accordance with the device and method for measuring a difference frequency generated upon self-mixing a laser light of the present invention, a difference frequency was measured by utilizing a method for measuring an optogalvanic current generated at a time when a part of frequency varied laser light was re-applied to the carbon dioxide laser and mixed oneself with laser inherent frequency.

Since the conventional difference frequency measuring device utilizing a carbon dioxide laser has measured by using generally MCT (Mercury Cadmium Telluride) detector cooled by liquid nitrogen, the liquid nitrogen should be replenished at predetermined time intervals, thereby presenting a hinderance in manufacturing a movable device due to a large volume of the liquid nitrogen storage container. Therefore, since the present invention can measure a difference frequency without using a detecting device cooled by liquid nitrogen and uses a laser generator itself as a detector, it has a very excellent effect that a reliability of the measuring device can be increased and the lifetime of the device can be, and the structure is extending while simplifying its structure and reducing a manufacturing cost.

What is claimed is:

1. A device for producing an electric potential having a difference frequency generated in a laser resonator utilizing a carbon dioxide laser, comprising:

a laser discharge tube having first and second electrodes, said tube containing a $CO_2$ gas mixture to produce a first coherent light at a frequency F1 for mixing with in externally-controlled second coherent light having a frequency F2;

a high voltage DC power supply for producing a discharge excitation in said tube and generating optogalvanic current at a difference frequency F1–F2;

a ballast resistor connected in series between said first electrode of the laser discharge tube and a positive terminal of said high voltage DC power supply;

a second resistor connected between a negative terminal of said high voltage DC power supply and said second electrode of said laser discharge tube, whereby a DC electric potential produced by said high voltage DC power supply and an AC electric potential difference having the difference frequency F1–F2 appears across said second resistor during the mixing of said first and second coherent lights; and a capacitor connected to said second electrode of said laser discharge tube for blocking the DC component produced by the high-voltage DC power supply such that only the AC electric potential component remains.

2. A device for producing an electric potential having a difference frequency generated in a laser resonator utilizing a carbon dioxide laser, comprising:

a laser discharge tube having first and second electrodes, said tube containing a $CO_2$ gas mixture to produce a first coherent light at a frequency F1 for mixing with an externally-controlled second coherent light having a frequency F1–F2;

a high voltage DC power supply for producing a discharge excitation in said tube and generating optogalvanic current at a difference frequency F1–F2;

a ballast resistor connected in series between said first electrode of the laser discharge tube and a positive terminal of said high voltage DC power supply; and a transformer corrected between said second electrode of said laser discharge tube and a negative terminal of said high voltage power supply, whereby an AC electric potential difference having the difference frequency F1–F2 appears across a secondary side of said transformer during the mixing said first and second coherent lights.

\* \* \* \* \*